Patented Oct. 22, 1946

2,409,861

UNITED STATES PATENT OFFICE 2,409,861

PROCESS AND AGENTS FOR THE RECOVERY OF MAGNESIUM IONS FROM BRINE

Melvin J. Hunter and William C. Bauman, Midland, Mich., assignors to The Dow Chemical Company, Midland, Mich., a corporation of Michigan No Drawing. Application February 2, 1942, Serial No. 429,303

5 Claims. (Cl. 23—50)

This invention concerns an improved process for the recovery of magnesium ions in relatively concentrated form from brines containing the same. It also concerns certain base exchange agents (also known as cation exchange agents) suitable for use in the process.

It is well known that the chemical reaction involved in the use of a base exchange agent is reversible and that the direction in which it proceeds is dependent to a large extent upon the relative proportions of the reactive positive ions, e. g. alkali metal ions and alkaline earth metal ions, on the exchange agent and in the liquor in contact with the exchange agent. For instance, in usual water softening processes the water is passed through a bed of a granular base exchange agent such as sodium aluminum silicate, whereby the alkaline earth metal ions in the water are absorbed by the exchange agent with displacement of alkali metal ions from the latter so that the water is depleted of alkaline earth metal ions and enriched in alkali metal ions. After becoming saturated with alkaline earth metal ions by such use in softening water, the exchange agent is reconditioned usually by passage of a dilute, e. g. of about 5 per cent concentration, sodium chloride solution over the same. The absorbed alkaline earth metal ions are displaced from the exchange agent by the sodium ions of the salt solution, thus reconverting the exchange agent into its sodium salt which may, of course, be used to soften further quantities of water.

In a co-pending application of John J. Grebe and William C. Bauman, Serial No. 429,185, filed concurrently herewith, and issued October 30, 1945, as U. S. Patent 2,387,898, it is disclosed that base exchange agents may be used to absorb magnesium ions from sea water, or similar brines containing a higher concentration of alkali metal than of magnesium ions, and that by thereafter treating the exchange agent with a fairly concentrated solution of sodium chloride or other alkali metal salt, the absorbed magnesium ions may be displaced from the exchange agent with formation of a magnesium salt solution which contains the magnesium ions in higher concentration than in the initial brine. It is also shown that although any of a wide variety of base exchange agents may be used in the process, such agents vary considerably as regards the convenience and economy with which they may be employed. Sulphonated organic resins are preferred, since they have the properties of rapidly absorbing magnesium ions from sea water, of rapidly and nearly completely liberating the absorbed magnesium ions upon subsequent treatment with an alkali metal salt solution and of swelling or shrinking only moderately during use in the process.

We have now found that organic resins which contain carboxyl groups (which resins are hereinafter referred to generically as "carboxylated resins") possess cation exchange properties and that when employed in the form of their ammonium or other alkali metal salts they are far more selective as regards their ability to absorb magnesium ions from brines which also contain alkali metal salts than are the sulphonated resins, i. e. the atomic ratio of magnesium ions to alkali metal ions which may be absorbed from such brine by a carboxylated resin is far higher than may be absorbed from a like brine by a sulphonated resin. In this connection it may be mentioned that during use for the absorption of magnesium ions from a brine containing the same and an equal or larger proportion of alkali metal ions no exchange agent is converted entirely into its magnesium salt. Instead, the reaction proceeds to a point at which there is equilibrium between the magnesium and alkali metal ions on the exchange agent and those in the brine contacted therewith. The alkali salts of the carboxylated resins usually also possess an exceptionally high absorptive capacity for magnesium ions.

However, the carboxylated resins have certain properties which render them inferior to the sulphonated resins when employed for the absorption of magnesium ions from brines using the hereinbefore described preferred procedure of the co-pending Grebe and Bauman application, Serial No. 429,185. For instance, most carboxylated resins swell or shrink markedly with change in the salinity of the aqueous liquors contacted therewith and, although these resins are exceptionally selective as regards the absorption of magnesium ions from brines which also contain alkali metal salts, they do not satisfactorily release the absorbed magnesium ions upon subsequent treatment with an aqueous solution of sodium chloride or other alkali metal salt, i. e. the magnesium salt solutions thus regenerated are of undesirably low concentration.

It is an object of this invention to provide a method whereby carboxylated resins may satisfactorily be used for the recovery of magnesium ions in relatively concentrated form from brines which also contain alkali metal salts and whereby the magnesium salt solution formed by displacement of the absorbed magnesium ions from the resin may be obtained in unusually high concentration and in a form containing not more than a minor amount of other salts. Another object is to provide certain new carboxylated resins which possess a combination of physical and chemical properties rendering them especially well suited to use in the process. Other objects will be apparent from the following description of the invention.

The present process comprises as its essential steps (1) passage of brine containing a magnesium salt and an equimolecular or higher proportion of an alkali metal salt through a bed of an ammonium or other alkali salt of a carboxylated resin, whereby the latter absorbs the magnesium ions (and other polyvalent metal ions if present) from the brine; (2) thereafter passing an aqueous solution of an acid through the bed to displace the absorbed magnesium ions from the carboxylated resin to form a relatively concentrated solution of a magnesium salt and at the same time convert the resin into its acid form; and (3) treating the resin with an aqueous solution of an alkali and a soluble alkali metal salt to form the alkali metal salt of the carboxylated resin so that the latter may be reemployed for the absorption of magnesium ions from the brine. In the first of these steps it is important that the resin be used in the salt form specified, since the carboxylated resins when in their acid form do not satisfactorily absorb magnesium ions from brines. The use of an acid capable of forming a soluble magnesium salt for displacement of the absorbed magnesium ions from the resin in the second step is required in order to recover the major portion of the magnesium absorbed by the resin. As hereinbefore mentioned, solutions of alkali metal salts do not react satisfactorily to displace the absorbed magnesium ions from the resin and the regenerated magnesium salt solution obtained by such use of an alkali metal salt is of undesirably low concentration. The presence of a soluble alkali metal salt in the alkali solution employed in the third of the foregoing steps is required in order to prevent excessive swelling of the resin. Water alone causes the alkali salts of the resins to swell greatly.

Brines from which magnesium ions may advantageously be recovered by the present method are those containing between 0.01 and 0.8 gram atomic weights of magnesium ions per liter and between 1 and 100 gram atomic weights of alkali metal ions per gram atomic weight of magnesium ions. Ordinary sea or ocean water and also many magnesium-containing inland brines, e. g. occurring in North America and elsewhere throughout the world, may be used as starting materials in the process.

The carboxylated resins which may be used as the base exchange agents are the resinous three dimensional polymers of unsaturated acids having the linear polymeric molecules bonded together with a polyfunctional group, e. g. by reaction with a glycol. A number of such carboxylated resins are described in U. S. Patents 1,945,307, 2,047,398 and 2,230,240, which patents, however, do not recognize the fact that the resins possess properties rendering them useful as base exchange agents.

In addition to the previously known carboxylated resins just mentioned, we have prepared certain new carboxylated resins which are especially well suited for use in the process. These new carboxylated resins are co-polymers of an alpha-beta-unsaturated dicarboxylic acid, a readily polymerizable vinyl or vinylidene compound which contains only a single olefine group in the molecule, and a polymerizable organic compound containing at least two olefine groups in the molecule. Examples of alpha-beta-unsaturated acids which may be used in making these resins are maleic acid, fumaric acid, citraconic acid, itaconic acid, etc. In place of these free acids, the corresponding acid anhydrides may be used. Examples of vinyl and vinylidene compounds containing a single olefinic group which may be used in making the products are styrene, alpha-methyl-styrene, ortho-methyl-styrene, meta-methyl-styrene, para-methyl-styrene, meta-ethyl-styrene, para-isopropyl-styrene, ortho-cloro-styrene, para-chloro-styrene, vinyl chloride, vinyl acetate, etc. Among the various polymerizable compounds containing two or more olefinic groups in the molecule which may be used in making the resins are divinyl benzene, butadiene, isoprene, tung oil, oiticica oil, divinyl ether, etc. The polyolefinic reactant serves as an agent for decreasing the tendency of the resin product to swell or shrink during use as a base exchange agent. It is believed to function principally as an agent for bonding together, or vulcanizing, the linear co-polymers of the other reactants and only a very small proportion thereof, e. g. an amount corresponding to 0.01 mole or less per mole of the unsaturated dicarboxylic acid is required. It may, of course, be used in much larger proportions. The alpha-beta-unsaturated dicarboxylic acid, or its anhydride, is preferably used in amount equal to or exceeding the sum of the molecular equivalents of the other polymerizable reactants so as to obtain a large number of carboxyl groups in the resin molecule. The mono-olefinic vinyl or vinylidene compound is used in molecular excess over the polyolefinic reactant but in amount not exceeding the molecular equivalent of the unsaturated dicarboxylic acid. The resin may be formed by heating a mixture of the reactants to a polymerizing temperature, e. g. between 70° and 175° C., until the co-polymeric product is a hard glass-like resin at room temperature. If desired, the reaction may be carried out in the presence of a solvent. The product is comminuted, if necessary, and treated as usual with an alkali, e. g. sodium or potassium hydroxide, to obtain the alkali metal salt thereof. The salts thus obtained are hard resinuous water-insoluble bodies having excellent cation exchange properties. Examples of such carboxylated resins are the copolymers of maleic acid, styrene and divinyl benzene; of maleic acid, vinyl chloride, and divinyl benzene; and of itaconic acid, styrene and butadiene; etc., and the alkali salts thereof.

In recovering magnesium ions in relatively concentrated form from sea water with any of the foregoing carboxylated resins, sea water is passed through a bed of the granular resin in the form of an alkali salt thereof until the resin is nearly saturated with magnesium ions absorbed from the brine, e. g. as evidenced by an increase in the magnesium ion content of the brine flowing away from the bed.

The absorbed magnesium ions are recovered from the resin by passing over the latter an aqueous solution of an acid capable of reacting to form a soluble magnesium salt. The acids employed for this purpose have ionization constants at 25° C. of $1.8 \times 10^{-5}$ or higher. In order to form a magnesium salt solution of higher concentration than in the initial brine, the acid solution must of course be of higher normality than the magnesium salt in said brine. In practice, the acids are used in the form of at least 1-normal aqueous solutions thereof. The concentration of the regenerated magnesium salt solution becomes higher, of course, with increase in the concentration of the acid used to form the same, but in some instances, e. g. when using sulphuric acid, it is necessary that the acid solution be sufficiently dilute to obtain the ionization necessary for rapid reaction. Among the various acids which may be used in this step of the process are hydrochloric acid, hydrobromic acid, sulphurous acid, sulphuric acid, nitric acid, acetic acid, formic acid, etc. Such acids react, of course, to form corresponding magnesium salts. It should be mentioned that the mid-portion of the regenerated magnesium salt solution is usually more concentrated than the fore and final portions and may advantageously be collected separately from said other portions. The regenerated magnesium salt solution usually contains only minor amounts of free acid or of alkali metal salts. It may be evaporated to crystallize the magnesium salt, which may, if desired, be electrolyzed or otherwise treated to produce metallic magnesium.

The acid form of the resin which remains after the treatment just described is reconditioned by treatment with an aqueous solution of an alkali and a corresponding salt of a strong acid, which salt serves to prevent excessive swelling of the resin. The concentration of such salt required to prevent excessive swelling varies somewhat depending upon the carboxylated resin employed and the particular salt used, but we usually employ the salt in the form of an at least 0.5 normal solution thereof. The concentration of alkali in the solution is of little consequence, i. e. the alkali may be used in dilute or centrated form as desired. Examples of alkalies and their salts which may be used in this treatment are ammonia, sodium and potassium hydroxides, sodium chloride, potassium chloride, ammonium chloride, sodium bromide, sodium sulphate, etc. In place of the hydroxides just mentioned, corresponding carbonates may be used, though not as conveniently as the hydroxides. The treatment with the alkaline solution results in the formation of a corresponding salt of the resin and thereby renders the latter suitable for reemployment in absorbing magnesium ions from brines.

The following examples describe a number of ways in which the principle of the invention has been applied and illustrate certain of its advantages, but they are not to be construed as limiting the invention.

*Example 1*

A solution of 90 parts by weight of purified styrene, 20 parts of divinyl benzene of 65 per cent purity (the remainder being largely ethyl-vinyl-benzene along with some styrene), 100 parts of maleic anhydride and 50 parts of acetone was heated at temperatures varying from 90° to 100° C. for 1.5 hours and then cooled. The product was a tough resinous solid at room temperature. It was reheated to 135° C. and maintained at said temperature for 2 hours, after which it was cooled and ground. The granular product was reheated to 135° C. at about 25 millimeters absolute pressure for approximately 5 hours to vaporize the acetone and any other volatile ingredients therefrom and again cooled. The product was screened to eliminate granules of sizes greater than 16 mesh and finer than 60 mesh. The remaining resin was soaked in an aqueous sodium hydroxide solution of 5 per cent concentration for about 16 hours, after which it was washed thoroughly, first with distilled water and then with a 5 per cent concentrated aqueous sodium chloride solution. A glass tube of 1 inch internal diameter was charged with 25.2 cubic inches of the resultant sodium salt of the resin and a 0.1 normal magnesium sulphate solution was passed through the tube until the resin had absorbed its capacity of magnesium ions from the liquor (as evidenced by an increase in the magnesium content of the effluent liquor). It was found that the resin had absorbed approximately 0.38 gram atomic weight of magnesium ions. The tube was drained of free-flowing liquor, after which 500 cubic centimeters of an aqueous hydrochloric acid solution of 15 per cent concentration was passed into and through the same. The resultant magnesium chloride solution, which contained nearly all of the magnesium that had been absorbed by the resin, was collected in successive portions as it flowed from the tube. 80 per cent of the magnesium which had been absorbed by the resin was collected in the richer mid-portions of the regenerated magnesium chloride solution, which mid-portions amounted to 200 cubic centimeters of liquor and contained an average of 147 grams of magnesium chloride per liter.

*Example 2*

The procedure of Example 1 was repeated, except that instead of using aqueous hydrochloric acid to displace the absorbed magnesium ions from the resin, 500 cubic centimeters of a 12.5 per cent concentrated aqueous sodium chloride solution was employed. Only 45 per cent of the magnesium ions absorbed by the resin was displaced therefrom and the resultant solution contained 18 grams per liter of magnesium chloride.

*Example 3*

The purpose of this example is to show the results obtainable when using a carboxylated resin for the absorption of magnesium ions from a brine as compared with those obtainable when using a sulphonated resin for said purpose. Due to the fact that absorbed magnesium ions are best displaced from a carboxylated resin by treatment with an acid whereas they are best displaced from a sulphonated resin by treatment with an alkali metal salt solution, the procedure employed in using the two resins was not the same. However, the brines employed as starting materials were identical in the two experiments and each resin was used in the form of its sodium salt for the absorption of the magnesium ions from the brines.

*Experiment A using a carboxylated resin*

The sodium salt of the resin described in Example 1 was employed. A glass tube of 1 inch internal diameter was charged with 25.2 cubic inches of the finely divided resin and a 0.1 normal magnesium chloride solution was passed through the resin bed until the latter had absorbed its capacity of magnesium ions (as evidenced by the fact that the liquor then flowing from the tube was a 0.1 normal magnesium chloride solution). The effluent liquor was collected and analyzed for magnesium chloride, whereby it was found that magnesium ions equivalent to 35.95 grams of magnesium chloride ($MgCl_2$) had been absorbed by the resin. The absorption of magnesium corresponded to 5.4 pounds of magnesium chloride per cubic foot of resin initially employed. 500 cubic centimeters of an aqueous hydrochloric acid solution of 15 per cent concentration was then passed through the resin bed and the resultant regenerated magnesium chloride solution was collected in portions as it flowed from the bed. All of the magnesium which had been absorbed by the resin was recovered as magnesium chloride in the effluent liquor. The highest concentration of magnesium chloride found in any of portions of the regenerated magnesium chloride solution was 163 grams per liter. 80 per cent of the regenerated magnesium chloride was recovered in 200 c. c. mid-portions of the effluent liquor, which mid-portions contained an average of 147 grams of magnesium chloride per liter. An aqueous solution containing 10 per cent by weight of sodium chloride and 5 per cent of sodium hydroxide was passed through the bed of resin to again form the sodium salt of the latter. A synthetic brine having approximately the sodium chloride and magnesium chloride content of sea water (i. e. containing 2.5 per cent by weight of sodium chloride and 0.5 per cent of magnesium chloride) was passed through the bed of resin until the brine flowing from the bed was of the same composition as that entering the bed. The effluent liquor was again collected and analyzed for magnesium chloride, whereby it was found that the resin had absorbed magnesium ions from the brine in amount corresponding to 29.68 grams of magnesium chloride. The amount of magnesium absorbed from this sodium chloride-containing brine was 82.5 per cent of that which the resin had previously absorbed from the solution of magnesium chloride alone.

*Experiment B using a sulphonated resin*

The finely divided sodium salt of Amberlite IR-1 (a sulphonated phenol-formaldehyde resin) was used in this experiment. A glass tube of 1 inch internal diameter was charged with 31.5 cubic inches of this resin and a 0.1 normal aqueous magnesium chloride solution was passed through the bed of resin until the latter had absorbed its capacity of magnesium ions therefrom. The amount of magnesium absorbed by the resin corresponded to 17.4 grams of magnesium chloride. The amount of magnesium absorbed corresponded to 2.1 pounds of magnesium chloride per cubic foot initial volume of the resin. One liter of a 12.5 per cent concentrated aqueous sodium chloride solution was then passed through the bed of resin and the resultant regenerated magnesium chloride solution was collected in 100 cubic centimeter portions as it flowed from the bed. The first 500 cubic centimeters of said solution to flow from the bed contained 16.31 grams of magnesium chloride, an amount corresponding to 93 per cent of the magnesium which had been absorbed by the resin. The 100 cubic centimeter portion of the solution which was richest in magnesium chloride contained 69 grams of magnesium chloride per liter. Eighty per cent of the magnesium which had been absorbed by the resin was recovered in mid-portions of the regenerated magnesium chloride solution having an average magnesium chloride content of 42 grams per liter.

The comparative data collected in the foregoing experiments A and B is summarized in the following table:

| Resin | Maximum capacity pounds of $MgCl_2$ cubic foot of resin | Capacity from sea water pounds of $MgCl_2$ cubic foot of resin | Maximum conc. of regenerated $MgCl_2$ grams per liter | $MgCl_2$ in richest 80% of regenerated $MgCl_2$ solution grams per liter |
|---|---|---|---|---|
| Carboxylated | 5.4 | 4.5 | 163 | 147 |
| Sulphonated | 2.1 | 1.2 | 69 | 42 |

Other modes of applying the principle of the invention may be employed instead of those explained, change being made as regards the method or agents herein disclosed, provided the steps or agents stated by any of the following claims or the equivalent of such stated steps or agents be employed.

We therefore particularly point out and distinctly claim as our invention:

1. In a method for recovering magnesium ions in relatively concentrated form from a brine containing the same and an alkali metal salt, the steps of passing the brine over an alkali salt of a carboxylated resin, whereby the latter absorbs magnesium ions from the brine, thereafter passing over the resin an at least 1-normal aqueous solution of an acid having an ionization constant of at least 1.8 times $10^{-5}$ to effect displacement of absorbed magnesium ions from the resin and form a magnesium salt solution of higher concentration than the initial brine, and subsequently treating the resin with an aqueous solution of an alkali and an alkali metal salt of a strong acid to form an alkali metal salt of the resin.

2. In a method for recovering magnesium ions in relatively concentrated form from a brine containing between 0.01 and 0.8 gram atomic weight per liter of the same and at least an equimolecular proportion of an alkali metal salt, the steps of passing the brine over an alkali metal salt of a carboxylated resin whereby the latter absorbs magnesium ions from the brine, thereafter passing an at least 1-normal aqueous hydrohalic acid solution over the resin to displace the absorbed magnesium ions and form a magnesium halide solution of higher magnesium ion content than that of the initial brine, and subsequently treating the resin with an aqueous alkali metal hydroxide solution which contains an alkali metal halide in a concentration of at least 0.5 normal, to again form the alkali metal salt of the resin.

3. The method as claimed in claim 2, when employing a resinous co-polymer of an alpha-beta-unsaturated dicarboxylic acid, a polymerizable organic compound selected from the class consisting of vinyl and vinylidene compounds containing a single olefine group in the molecule, and a polymerizable organic compound containing at least two olefinic groups in the molecule as the carboxylated resin.

4. The method as claimed in claim 2, when employing a resinous co-polymer of maleic acid, styrene and divinyl-benzene as the carboxylated resin.

5. The method which comprises passing a brine that contains between 0.01 and 0.8 gram atomic weight of magnesium ions, and at least an equimolecular proportion of an alkali metal salt, per liter of the brine into contact with an alkali metal salt of a carboxylated resin, whereby alkali metal ions are displaced by magnesium ions from the alkali metal carboxylated radicals of the resin with formation of a magnesium salt of the carboxylated resin and magnesium ions are thereby withdrawn from the brine.

MELVIN J. HUNTER.
WILLIAM C. BAUMAN.